March 9, 1965 J. MARTIN Re. 25,742

BORDER STABILIZERS

Original Filed July 20, 1961

INVENTOR

Joseph Martin

BY Gustav Drews his ATTORNEY

United States Patent Office

Re. 25,742
Reissued Mar. 9, 1965

25,742
BORDER STABILIZERS

Joseph Martin, Laurelton, N.Y., assignor to Eclipse Sleep Products, Inc., Brooklyn, N.Y., a corporation of New York Original No. 3,093,840, dated June 18, 1963, Ser. No. 125,520, July 20, 1961. Application for reissue Mar. 23, 1964, Ser. No. 366,674
3 Claims. (Cl. 5—260)

Matter enclosed in heavy brackets [ ] appears in the original patent but forms no part of this reissue specification; matter printed in italics indicates the additions made by reissue.

This invention relates to border stabilizers for mattresses, box springs, upholstered items and the like, and is particularly related to stabilizers of the class illustrated in United States Letters Patent No. 2,509,831 issued May 30, 1950.

Among the objects of the present invention it is aimed to provide an edge stabilizer for a mattress, box spring, and the like, of the class illustrated in said United States Letters Patent No. 2,509,831 composed of yieldable wire in which the laterally extending ends characterized by circular loops extend inwardly and are disposed on opposite sides of the stabilizer in order to counteract the stresses and strains on the laterally extending ends of the stabilizer to guard the stabilizer from buckling or bulging laterally.

It is still another object of the present invention to provide an edge stabilizer for a mattress, box spring, or the like, of the class illustrated in said United States Letters Patent No. 2,509,831 composed of yieldable wire in which the laterally extending ends characterized by circular loops extend inwardly and are disposed on opposite sides of the stabilizer and constitute the abutments for the ends of a helical spring which extends from one loop to the other to aid and cooperate with the elasticity in the wire of the stabilizer proper to return the stabilizer to its normally expanded position after having been compressed when in use.

It is a further object of the present invention to provide an edge stabilizer for a mattress, box spring, or the like, of the class illustrated in said United States Letters Patent No. 2,509,831 composed of yieldable wire in which the laterally extending ends characterized by circular loops extend inwardly and are disposed on opposite sides of the stabilizer and in which the ends of the wire are twisted over one another to incline in opposite directions with the opposite positions of said loops to counteract the stresses and strains on the laterally extending ends of the stabilizer thereby to guard the stabilizer from buckling or bulging laterally.

These and other features, capabilities, and advantages of the invention will appear from the subjoined detailed description of specific embodiments thereof illustrated in the accompanying drawings in which.

Figure 1:
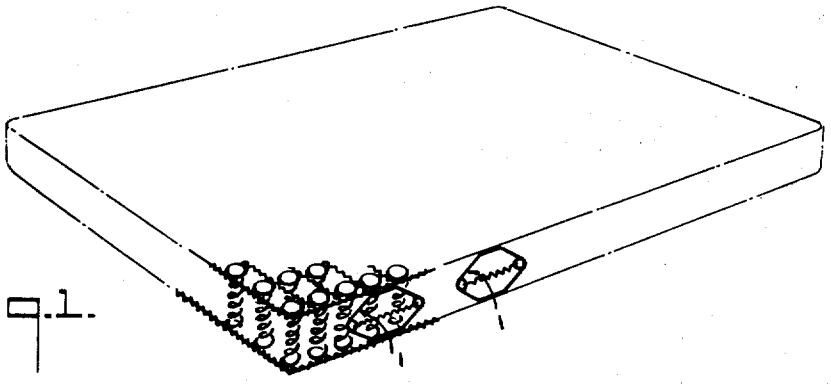
FIG. 1 is a fragmental perspective of a mattress equipped with the improved stabilizer made according to one embodiment.
Figure 2:
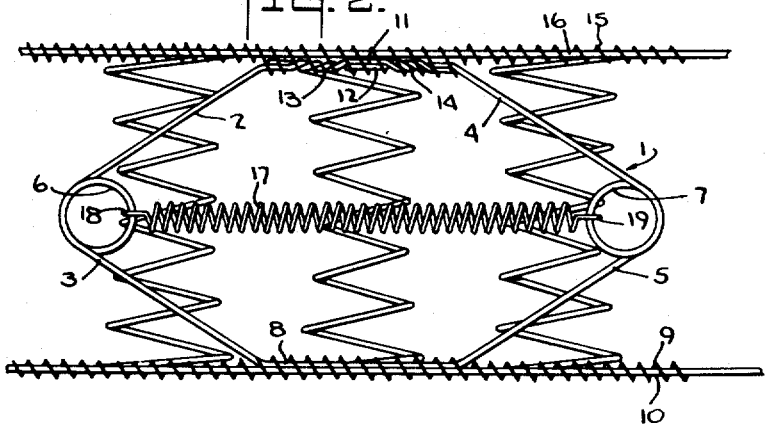
FIG. 2 is an enlarged side elevation of the stabilizer shown in FIG. 1.
Figure 3:
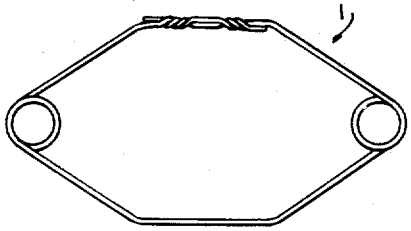
FIG. 3 is a side elevation on a smaller scale than FIG. 2 of a second embodiment of the invention.

In the embodiment illustrated in FIGS. 1, 2 and 3, the stabilizer 1 consists essentially of upper and lower abutments, outwardly extending extensions between said abutments, and inwardly extending loops formed in the outer ends of the outwardly extending extensions. More specifically, the stabilizer 1 composed of a yieldable material such as wire or narrow flat stock is provided with two outwardly extending pairs of inclined sides 2, 3 and 4, 5, constituting outwardly extending extensions, connected to one another by the circular loops 6 and 7 respectively constituting inwardly positioned abutments at the outer ends of said outwardly extending extensions. The lower inclined sides 3 and 5 are connected by the lower horizontally extending side 8 constituting the lower abutment which is connected by the helical connecting spring 9 to the lower border wire 10 and the upper inclined sides 2 and 4 terminate in the upper sides [11] *12* and [12] *11 respectively*, constituting an upper abutment, which overlap and are connected to one another by any suitable means such as the twists 13 and 14 and then connected by the helical connecting wire 15 to the upper border wire 16 of the mattress frame.

The sides [11] *12*, 2, 3, 8, 5, 4 and [12] *11*, constituting an endless unit, and loops 6 and 7 are part of a single resilient wire. A second helical spring 17 is provided with hook formations 18 and 19 at its ends which engage the loops 6 and 7 respectively and maintain the loops 6 and 7 at a predetermined tension relative to one another determined by the cooperation of the elasticity in the spring wire of the unit 1 and the elasticity in the helical spring 17. The spring 17 thereby in turn facilitates adjusting the tension in the stabilizer either by eliminating the helical spring 17 and relying only on the rhomboid construction 1 or twisting the helix of the spring 17 more or less according to the tension required.

Excellent results have been achieved when the wire constituting the unit 1 illustrated in FIGS. 1, 2 and 3, is No. 13 gauge of about 0.0915″ in diameter and when the wire of the helical spring 17 is composed of wire of No. 17 gauge of about 0.052″ in diameter.

With regard to adjustment by means of the helical spring 17, attention is called to the fact that when the wire of the unit 1 is composed of high carbon steel wire No. 13 gauge of about 0.0915″ in diameter and in size approximates 8″ from the inner periphery of loop 6 to the inner periphery of the loop 7, of about 10½″ from the outer periphery of the loop 6 to the outer periphery of the loop 7 and about 5½″ from the outer periphery of the sides 11 and 12 to the outer periphery of the side 8, and the helical spring 17 in its free unstretched extent is about 8″ in length, the diameter of the helix about ½″ and the wire is composed of high carbon steel of about No. 17 gauge of about 0.052″ in diameter, that then the load will be increased from two pounds to two and three-quarter pounds when the helix of the wire 17 is given two turns as contrasted to its free unstretched condition.

The upper portion of the loop 6 is disposed on the front side of the unit 1 while the lower portion of the loop 6 is disposed on the rear face of the unit 1 looking at FIGS. 1, 2 and 3, whereas the upper portion of the loop 7 is on the rear face of the unit 1 and the lower portion of the loop 7 is on the front side of the unit 1, looking at FIGS. 1, 2 and 3. In turn, although the twists 13 and 14 looking at the same from the right hand side of FIG. 2 are twisted in the same direction, the inclinations of the two twists are in opposite directions thereby to cooperate with the formation of the loops 6 and 7 on opposite sides of the unit 1 to counteract any buckle or bulge laterally in one direction. In other words, since, *when in use*, the pressure is downwardly, the tendency would be to bulge the end of the stabilizer 1 at the loop 6 outwardly while the buckle or bulge on the end of the unit adjacent the loop 7 would tend to buckle inwardly looking at FIG. 2. In turn, the twist 13 when the unit 1 is compressed would tend to unravel and cause the unit 1 to buckle outwardly and the twist 14 would tend to unravel and buckle the unit 1 inwardly. Consequently, there would be the tendency of the twist 13 and loop 6 to buckle outwardly counteracted by the tendency of the twist 14 and loop 7 to buckle inwardly and protect the unit from buckling in the same direction.

Figure 4:
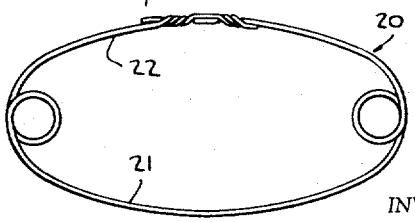
FIG. 4 is a side elevation on the scale of FIG. 3 of a third embodiment.

The embodiment illustrated in FIG. 4 is distinguished from the embodiment in FIGS. 1, 2 and 3 in that in place of the sides 3, 8 and 5 of the embodiment illustrated in FIGS. 1, 2 and 3, the lower portion of the unit 20 is formed into a single arc 21 in the embodiment illustrated in FIG. 4 and the sides 2, 11, 12 and 4 of the embodiment illustrated in FIGS. 1, 2 and 3 are formed into a single arc 22 in the embodiment illustrated in FIG. 4.

Figure 5:
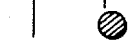
FIG. 5 is a cross section of the wire used in the embodiments of FIGS. 1 to 4 inclusive.
Figure 6:
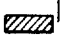
FIG. 6 is a cross section of a narrow flat stock used in place of the round stock illustrated in FIG. 5.

FIG. 5 illustrates a cross section of a round wire such as illustrated in FIGS. 1, 2, 3 and 4 inclusive and FIG. 6 is a cross section of a flat stock from which the unit 1 of FIGS. 1, 2 and 3 and unit 20 of FIG. 4 may be formed.

While the spiral spring 17 is desirable when the mattress is to be used to support fairly heavy loads, with mattresses for children and persons of lighter weight, the springs 17 may be omitted as illustrated in FIGS. 3 and 4.

I claim:

1. A [boarder] *border* stabilizer for a mattress or the like having an upper and a lower border wire, said stabilizer being composed of an elastic material and having upper and lower substantially longitudinally extending abutments, helical connecting springs connecting said abutments to said upper and lower border wires, said stabilizer having outwardly protruding extensions intermediate and about midway between said border wires, *inwardly protruding loops extending from the middle of each extension,* said abutments, extensions, and loops disposed in a substantially common vertical plane, [inwardly protruding loops extending from the middle of each extension,] said loops extending from opposite sides of the plane of said stabilizer, [and one free end of said elastic material is twisted around said elastic material adjacent its other free end inclining in one direction, and the other free end of said elastic material is twisted around said elastic material adjacent said one free end inclining in the other direction] *and the free ends of said elastic material being twisted into a double twist adjacent one another which twists incline in opposite directions to one another.*

2. A border stabilizer for a mattress or the like having an upper and a lower border wire, said stabilizer having upper and lower substantially longitudinally extending abutments, helical connecting springs connecting said abutments to said upper and lower border wires, said stabilizer comprising a single yieldable wire formed into outwardly protruding extensions intermediate and about midway between said border wires, inwardly protruding loops extending from the middle of each extension, said abutments, extensions, and loops disposed in a substantially common vertical plane, means for connecting the ends of said wire to one another, said loops extending from opposite sides of said stabilizer, [and one free end of said wire is twisted around said wire adjacent its other free end inclining in one direction and the other free end of said wire is twisted around said wire adjacent said one free end inclining in the other direction] *and said connecting means consisting of the free ends of said wire being twisted into two twists adjacent to one another inclining in opposite directions to one another.*

3. A border stabilizer for a mattress or the like having an upper and a lower border wire, said stabilizer having upper and lower substantially longitudinally extending abutments, helical connecting springs connecting said abutments to said upper and lower border wires, said stabilizer comprising a single yieldable wire formed into six sides with the upper and lower sides constituting said upper and lower abutments and the remaining four sides formed into pairs, the sides of each pair of equal length, the sides of each pair forming an acute angle with one another and extending outwardly from said abutments and in turn forming obtuse angles with said abutments, a helical tension spring, inwardly extending loops at the acute angles of each pair of outwardly extending sides connecting the ends of said tension spring to said sides, said loops extending from opposite sides of said stabilizer, said six sides and loops disposed in a substantially common vertical plane, [and one free end of said wire is twisted around said wire adjacent its other free end inclining in one direction and the other free end of said wire is twisted around said wire adjacent said one free end inclining in the other direction] *and the free ends of said wire being twisted into two twists adjacent to one another and inclining in opposite directions to one another.*

References Cited by the Examiner

The following references, cited by the Examiner, are of record in the patented file of this patent or the original patent.

UNITED STATES PATENTS

| | | | |
|---|---|---|---|
| 2,509,831 | 5/50 | Martin | 5—351 |
| 2,703,414 | 3/55 | Bank | 5—261 X |

FOREIGN PATENTS

| | | |
|---|---|---|
| 226,173 | 12/59 | Australia. |
| 1,231,561 | 4/60 | France. |

FRANK B. SHERRY, *Primary Examiner.*